United States Patent
Lee et al.

(10) Patent No.: US 9,355,428 B2
(45) Date of Patent: May 31, 2016

(54) METHOD AND APPARATUS FOR DATA PROCESSING USING GRAPHIC PROCESSING UNIT

(71) Applicant: Samsung Electronics Co. Ltd., Suwon-si, Gyeonggi-do (KR)

(72) Inventors: Ilho Lee, Suwon-si (KR); Youngwoo Ahn, Seoul (KR); Inchoon Yeo, Suwon-si (KR); Changsung Lee, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 264 days.

(21) Appl. No.: 13/940,947

(22) Filed: Jul. 12, 2013

(65) Prior Publication Data

US 2014/0022268 A1    Jan. 23, 2014

(30) Foreign Application Priority Data

Jul. 18, 2012    (KR) ......................... 10-2012-0078326

(51) Int. Cl.
  *G06T 1/60*    (2006.01)
  *G06T 1/20*    (2006.01)

(52) U.S. Cl.
  CPC .... *G06T 1/20* (2013.01); *G06T 1/60* (2013.01)

(58) Field of Classification Search
  None
  See application file for complete search history.

(56) References Cited

U.S. PATENT DOCUMENTS

| | | |
|---|---|---|
| 7,567,252 B2 | 7/2009 | Buck et al. |
| 7,755,631 B1 | 7/2010 | Mrazek et al. |
| 7,940,274 B2 | 5/2011 | Bakalash et al. |
| 7,950,003 B1 | 5/2011 | Duca et al. |
| 2005/0197977 A1* | 9/2005 | Buck et al. ............... 706/12 |
| 2008/0094407 A1* | 4/2008 | Xu et al. ............... 345/552 |
| 2011/0242115 A1 | 10/2011 | Tsao et al. |

OTHER PUBLICATIONS

Buck et al., Brook for GPUs: Stream Computing on Graphics Hardware, ACM Transactions on Graphics, ACM, Aug. 8, 2004, pp. 777-786, XP002518743, Stanford University.
Tarditi et al., Accelerator: Using Data Parallelism to Program GPUs for General-purpose Uses, Oct. 21, 2006, pp. 325-335, XP002500986, Microsoft Research.
McCormick et al.; Scout: A Data-parallel Programming Language for Graphics Processors, Nov. 1, 2007, pp. 648-662, XP 022331775, vol. 33, No. 10-11, The University of Utah.
Fritz et al.: CGIS, A New Language for Data-parallel GPU Programming, Nov. 16-18, 2004, pp. 241-248, XP002714618, Stanford.
McCool; Signal Processing and General-purpose Computing and GPUs, IEEE Signal Processing Magazine, vol. 24, No. 3, May 1, 2007, pp. 109-114, XP011201391, NJ.
Owens et al.: GPU Computing, vol. 96, No. 5, May 1, 2008, pp. 879-899, XP011207684, IEEE, New York.
McCool et al.; Meta Programming GPUs with Sh, XP002714619, ISBN 1-56881-229-9, 2004, pp. xv-41, AK Peters.
Fernando et al., Programming Graphics Hardware, Eurographics 2004, Jun. 21, 2012, XP055141935.
Fang et al., Techniques for Efficient DCT/IDCT Implementation on Generic GPU, Conference Proceedings, IEEE International Symposium on Circuits and Systems, May 23-26, 2005, pp. 1126-1129, XP010815756.

* cited by examiner

*Primary Examiner* — Jacinta M Crawford
(74) *Attorney, Agent, or Firm* — Jefferson IP Law, LLP

(57) ABSTRACT

A method of processing data using a Graphic Processing Unit (GPU) is provided. The method includes obtaining operand data and operator information to be applied to the operand data, partitioning the operand data by a channel element size unit of a texel of the GPU, transmitting an instruction which controls the GPU to return an operation result by performing an operation for the partitioned data and transmitting the partitioned data, and obtaining an operation result value from the GPU.

13 Claims, 10 Drawing Sheets

METHOD AND APPARATUS FOR DATA PROCESSING USING GRAPHIC PROCESSING UNIT

CROSS-REFERENCE TO RELATED APPLICATION(S)

This application claims the benefit under 35 U.S.C. §119(a) of a Korean patent application filed on Jul. 18, 2012 in the Korean Intellectual Property Office and assigned Serial No. 10-2012-0078326, the entire disclosure of which is hereby incorporated by reference.

TECHNICAL FIELD

The present disclosure relates to a method and an apparatus for data processing. More particularly, the present disclosure relates to a method and an apparatus for data processing using a Graphic Processing Unit (GPU).

BACKGROUND

In general, a Central Processing Unit (CPU) is utilized so as to process data. Recently, the performance of a CPU is significantly increased, and more particularly, a Single Instruction Multiple Data (SIMD) architecture is used to perform an efficient operation of an application program for multimedia and signal processing. The SIMD, which is a kind of parallel processing, refers to a scheme that simultaneously calculates a plurality of values with a single instruction.

Generally, the GPU is an apparatus for graphic processing. Recently, a General-Purpose GPU (GPGPU) is utilized. At present, the GPGPU is utilized in a desktop computer. In order to operate the GPGPU, a programmer has to program by utilizing Open Computing Language (OpenCL)/Compute Unified Device Architecture (CUDA™).

A GPGPU is expensive and more complicated than a normal GPU. Thus, if the normal GPU is used for operations other than graphics operations when a complicated graphics operation is not performed, it would be conducive to the improvement of the performance of the electronic device.

Therefore, a need exists for a method and an apparatus for data processing using a GPU that can improve the performance of an operation.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for data processing using a Graphic Processing Unit (GPU) that can improve the performance of an operation.

In accordance with an aspect of the present disclosure, a method of processing data using a GPU is provided. The method includes obtaining, by a data handler, operand data and operator information to be applied to the operand data, partitioning, by the data handler, the operand data by a channel element size unit of a texel of the GPU, transmitting, by a frame buffer manager, an instruction which controls the GPU to return an operation result by performing an operation for the partitioned data and transmitting the partitioned data, and obtaining, by the frame buffer manager, an operation result value from the GPU.

In accordance with another aspect of the present disclosure, an apparatus for processing data using a GPU is provided. The apparatus includes a data handler configured to obtain operand data and operator information to be applied to the operand data, and configured to partition the operand data by a channel element size unit of a texel of the GPU, and a frame buffer manager configured to transmit an instruction which controls the GPU to return an operation result by performing an operation for the partitioned data and transmitting the partitioned data, and configured to obtain an operation result value from the GPU.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following detailed description in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
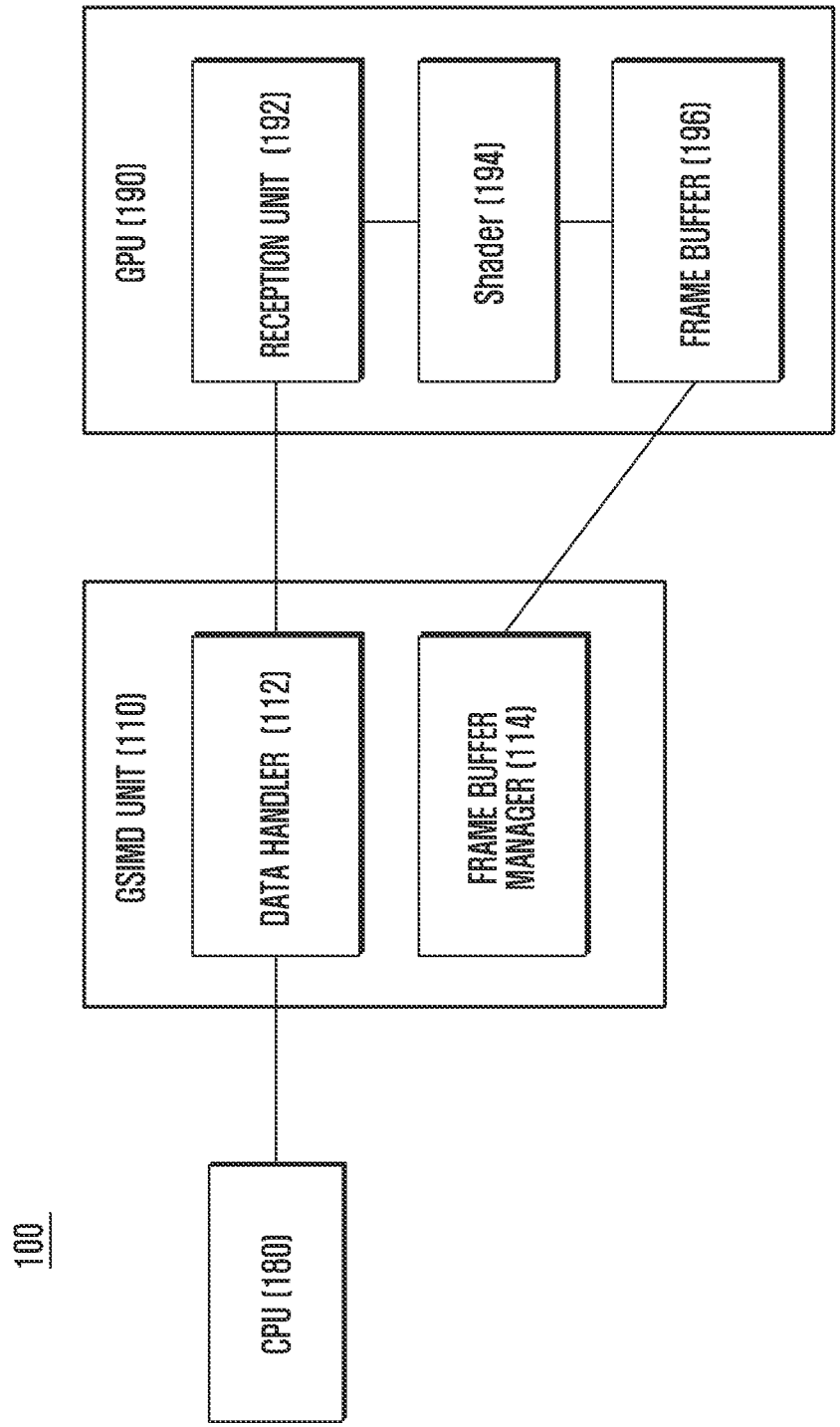
FIG. 1 is a block diagram of a data processing unit according to an embodiment of the present disclosure.

FIG. 1 is a block diagram of a data processing unit according to an embodiment of the present disclosure;

Referring to FIG. 1, a data processing unit 100 may include a Central Processing Unit (CPU) 180, a Graphic Processing Unit (GPU) Single Instruction Multiple Data (SIMD) (GSIMD) unit 110, and a GPU 190. Here, it is described that the GSIMD unit 110 is independent of the CPU 180. However, the GSIMD unit 110 may be implemented in the form of a software which is executed in the CPU 180, or a library that provides a function that is used during the operation of the CPU 180. Hereinafter, for convenience, it is assumed that the CPU 180 refers to a part that excludes a function of the GSIMD unit 110 among the actual configuration of the CPU 180. Accordingly, hereinafter, it is described that the CPU 180 is logically separated from the GSIMD unit 110. However, the present disclosure is not limited thereto.

The CPU 180 controls overall operation of the data processing unit 100. More particularly, when obtaining operand data and operator information for applying to the operand data, the CPU 180 performs an operation and returns the result of the operation. The operation of the CPU 180 may be set by an operating system, a user program, other software, or the like. More particularly, according to an embodiment of the present disclosure, in a case of the operation which is set to perform an operation by using the GPU 190, the CPU 180 performs an operation by using the GSIMD unit 110 and the GPU 190. In this case, the CPU 180 may transform the operand data and the operator information through the GSIMD unit 110 and send to the GPU 190. In addition, the CPU 180 may obtain the result from the GPU 190 through the GSIMD unit 110.

The programmer may use an instruction similar to or identical with an SIMD instruction so that the CPU 180 may utilize the GSIMD unit 110. Hereinafter, an instruction interface for utilizing the GSIMD unit 110 by the CPU 180 is named a GSIMD Application Program Interface (API).

For example, the GSIMD API may include a GSIMD_AXPY (X, Y, a, b, sizeX, sizeY) function. Here, the X is an arrangement (or includes sets, lists, and other similar structures and the same shall apply hereinafter) that includes one or more data, and the sizeX means the number of data included in the X. The Y is an arrangement including one or more data, the sizeY means the number of data included in the Y. When the sizeX or sizeY is 0, it may be processed as an error, or a null may be returned.

When calling a GSIMD_AXPY function, the GSIMD unit 110 performs an operation for each element of X and each element of Y by utilizing the GPU 190 and returns the result. For example, if the $i^{th}$ element of X is x_i and the $i^{th}$ element of Y is y_i, the result value z_i of $i^{th}$ is (x_i*a+y_i+b), or z_i=(x_i*a+y_i+b). After obtaining the arrangement of the result value, the GSIMD unit 110 returns it to the CPU 180. An actual operation is performed in the GPU 190, and operation for various elements of X and Y may be performed in a plurality of shaders 194 in parallel. When the value of the sizeX is different than the value of the sizeY, the GSIMD unit 110 may process this as an error, or may perform an operation with respect to data of the number corresponding to the smaller value among the sizeX and the sizeY.

API may include, for example, an arithmetic of an integer/real number, an arithmetic of a complex number, a product of a matrix, a transpose of a matrix, an inverse matrix operation, an inner product of a vector, a cross product of a vector, a function for an operation for one or more data, and the like.

The GSIMD unit 110 provides an interface between the CPU 180 and the GPU 190. When obtaining the operand data and the operator information for applying to the operand data, the GSIMD unit 110 partitions and/or transforms the operand data and sends the partitioned and/or transformed operand data to the GPU 190. In addition, the GSIMD unit 110 may send an instruction to the GPU 190 when the instruction tells what operation should be performed by the GPU 190 and how the result value should be returned based on the operator information.

The GSIMD unit 110 may include a data handler 112 and a frame buffer manager 114. The data handler 112 partitions the operand data with a certain size and sends the partitioned operand data to the GPU 190. The frame buffer manager 114 determines the size and/or the location of a frame buffer to which the GPU 190 returns the operation result and may notify this to the GPU 190. A configuration of the GSIMD unit 110 may be altogether implemented with one module. However, for the convenience of illustration, it is assumed that the GSIMD unit 110 includes the data handler 112 and the frame buffer manager 114.

The GPU 190 restores the partitioned operand data sent from the GSIMD unit 110, and performs an operation according to the sent instruction to return the operation result.

The GPU 190 may include a reception unit 192, the shader 194, and a frame buffer 196.

The reception unit 192 receives the partitioned operand data and the instruction to be executed from the GSIMD unit 110. The shader 194 performs the instruction to be executed by using the received (partitioned) operand data and stores the result value into the frame buffer 196. The GSIMD unit 110 may designate the size and/or the location on the frame buffer 196 to which the result value is returned through the instruction. The GSIMD unit 110 or the CPU 180 may receive the result value in a designated location of the frame buffer 196.

The GPU of the related art itself is not an element that performs a normal data operation, for example, a matrix product, and a matrix sum, or an operation, such as a multiplication of an integer, and an addition of a real number to return the operation result. However, according to the present disclosure, the GSIMD unit 110 transforms the operand data into a graphic data format, that is, a format of being stored in texel, to send to the GPU 190. The GPU 190 performs a normal data operation by using a graphic processing function, which is an original function, and returns this to the GSIMD unit 110. More specifically, the GPU 190 restores the data of the graphic data format into an original operand data to perform a normal data operation and transforms the result also into the graphic data format, that is, into the format of being stored in texel to return through the frame buffer 196. Through this scheme, a normal data can be performed as well as a graphic processing that the CPU 180 is originally able to perform. In addition, while the CPU 180 performs an additional operation, the GPU 190 may simultaneously perform another operation in parallel such that the performance of data operation can be maximized.

An operation of the CPU 180, the GSIMD unit 110, and the GPU 190 is described below with reference to FIG. 2 to FIG. 9.

Figure 2:
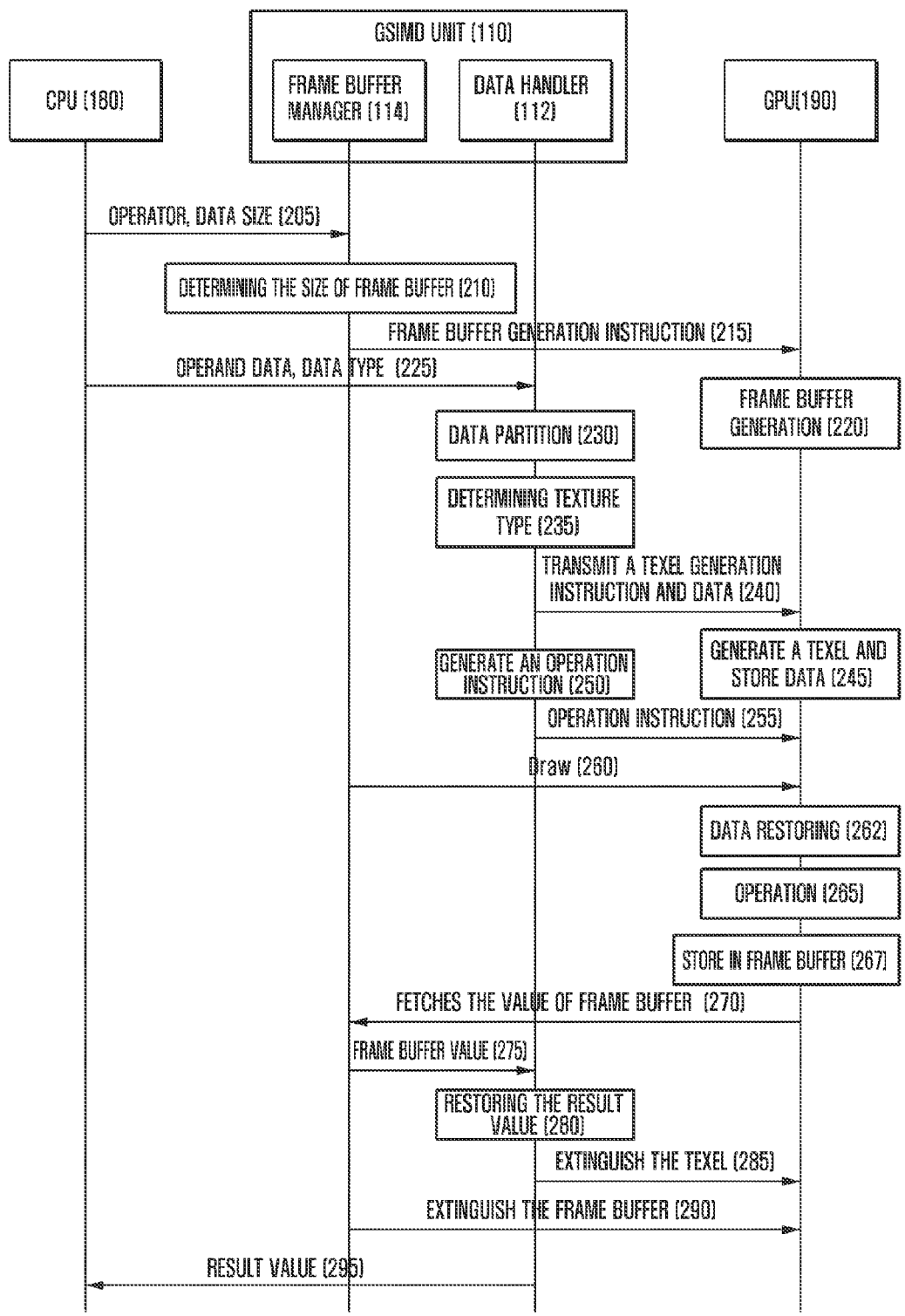
FIG. 2 is a flowchart of a data processing procedure of a data processing unit according to an embodiment of the present disclosure.

FIG. 2 is a flowchart of a data processing procedure of a data processing unit according to an embodiment of the present disclosure.

Referring to FIG. 2, the frame buffer manager 114 of the GSIMD unit 110 obtains an operator information and a size information of operand data from the CPU 180 at operation 205. The GPU 190 may process a plurality of data in parallel, and the GSIMD unit 110 also may receive a plurality of data and send to the GPU 190 to process. The operator information is information of an operation that should be performed with respect to operand data. The size information of the operand data includes the number of operand data. For example, when calculating the sum of X including eight integers of 4 bytes and Y including eight integers of 4 bytes, the number information is eight. The size information of unit data may be further included depending on an embodiment. For example, if data for a unit is an integer of 4 bytes, the size information of unit data becomes 4. When data for the unit is an integer of 1 byte, the size information of unit data becomes 1. If the operand data is a matrix, the size information of operand data may include the number information of a row and the number information of a column of the matrix. If the operator is a matrix product, the number information of the row and the number information of the column can be provided as the size information of operand data with respect to two matrices which are object of a matrix product.

The frame buffer manager 114 determines the size of frame buffer to which the result value is to be returned based on the operator information and the data size information at operation 210. When the size of unit data is 4 bytes and the result value includes eight unit data, a frame buffer space corresponding to 32 bytes is assigned as a frame buffer space to which the result value is returned. When the size of the frame buffer is determined to be a minimum size which is required to return the result value, the best performance is implemented. In addition, as described below, when two or more 1 byte or 2 bytes data are combined to be stored into a texel of 4 bytes space, the improvement of performance may be anticipated.

When the size of the operand data is identical with the size of the result value data, the size of the frame buffer to which the result value is to be returned is determined according to the size of the operand data. For example, when the operand data X is eight integers of 4 bytes, the operand data Y is eight integers of 4 bytes, and the operator is a sum of two data, the result value is eight integers of 4 bytes. Accordingly, the size of the frame buffer to which the result value is to be returned becomes 32 bytes. However, in a case of the product of a matrix or the inner product of a vector, the size of the operand data is different from the size of the result value data, and thus, an additional processing is required.

When the operator is the inner product of a vector, the result value is identical with the size of unit data (i.e., a vector component) among operation data (i.e., a vector). If the vector component is an integer of 4 bytes, the result value occupies 4 bytes.

Figure 3:
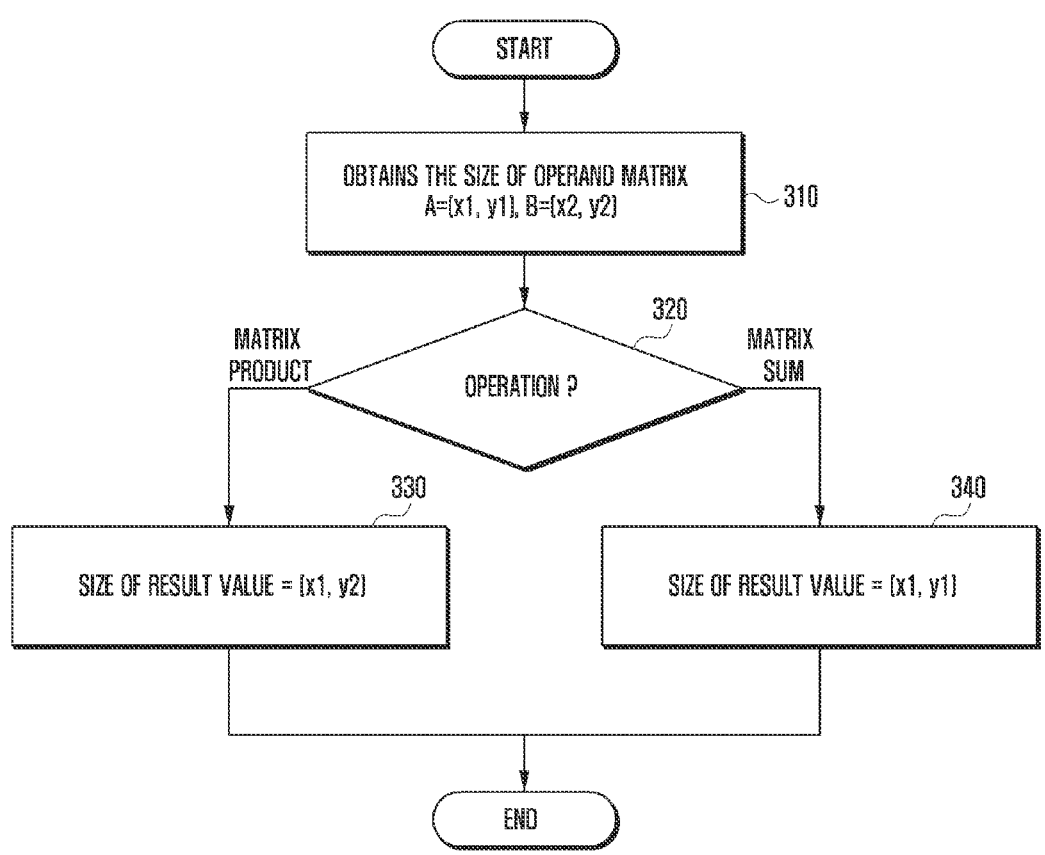
FIG. 3 is a flowchart illustrating a procedure of determining a size of result value data when an operator is a multiplication of a matrix or a sum of a matrix according to an embodiment of the present disclosure.

FIG. 3 is a flowchart illustrating a procedure of determining a size of result value data when an operator is a multiplication of a matrix or a sum of a matrix according to an embodiment of the present disclosure.

Referring to FIG. 3, the GSIMD unit 110 obtains the size information of operand data, that is, an operand matrix (A and B) at operation 310. In this embodiment, data A has x1 rows and y1 columns. Data B has x2 rows and y2 columns.

The GSIMD unit 110 determines what kind of operator is indicated by the operator information at operation 320. When the operator information indicates a matrix product, the procedure proceeds to operation 330. The GSIMD unit 110 determines that the result data has x1 rows and y2 columns at operation 330. When the operator information indicates a matrix sum, the procedure proceeds to operation 340. The GSIMD unit 110 determines that the result data has x1 rows and y1 columns at operation 340.

When the operator information indicates a matrix product, y1 should have the same value as x2. When this condition is not satisfied, the GSIMD unit 110 may notify the CPU 180 that the received operator information and the operand data include an error. In addition, when the operator information indicates a matrix sum, x1 should have the same value as x2, and y1 should have the same value as y2. Similarly, when this condition is not satisfied, the GSIMD unit 110 may notify the CPU 180 that the received operator information and the operand data include an error.

The case of a matrix product and a matrix sum is described in FIG. 3, however, a similar determination may be performed for other operators.

Referring back to FIG. 2, when determining the size of a frame buffer to which the result value data is returned at operation 210, the size of texel which is a unit element of a frame buffer may be considered. For example, if the (maximum) size of texel is 4 bytes, and the element of a matrix of an operation result value is also an integer of 4 bytes, 16(=4× 4) texels may be assigned as the frame buffer to which the result value data is returned when the result value data is 4×4 matrix.

However, the element of the matrix of the operation result is an integer of 2 bytes, two modes can be assumed. In a quick processing mode, the GPU 190 stores two elements (2 bytes) in one texel (4 bytes) to return. For example, the result value data is 4×4 matrix, eight texels of 4 bytes may be used. However, in a normal processing mode, the GPU 190 may use a texel which has a size of 2 bytes and store one element in one texel to return. For example, when the result value data is a 4×4 matrix, sixteen texels of 2 bytes can be used. The number of frame buffer is decreased in the quick processing mode, such that the performance may be enhanced.

The frame buffer manager 214 sends a frame buffer generation instruction including the size of the determined frame buffer to the GPU 190 at operation 215. At operation 220, the GPU 190 generates a result value frame buffer according to the frame buffer generation instruction of operation 215. Location information of the result value frame buffer may be known to the GSIMD unit 110, before the GSIMD unit 110 fetches the result value from the GPU 190, or when the GSIMD unit 110 fetches the result value from the GPU 190.

The CPU 180 sends the operand data and the type of operand data to the data handler 112 at operation 225. The type of operand data refers to a unit data type of operand data. For example, if the operand data is an integer matrix of 4 bytes, the type of operand data is an integer of 4 bytes. The type of operand data may include, for example, an integer and a floating point real number. Furthermore, a unit data of other type, such as a complex number, may be utilized.

According to a modified example, the information/data sent at operation 225 and the information/data sent at operation 205 may be sent altogether at a single operation.

The data handler partitions the data at operation 230.

Figure 4A:
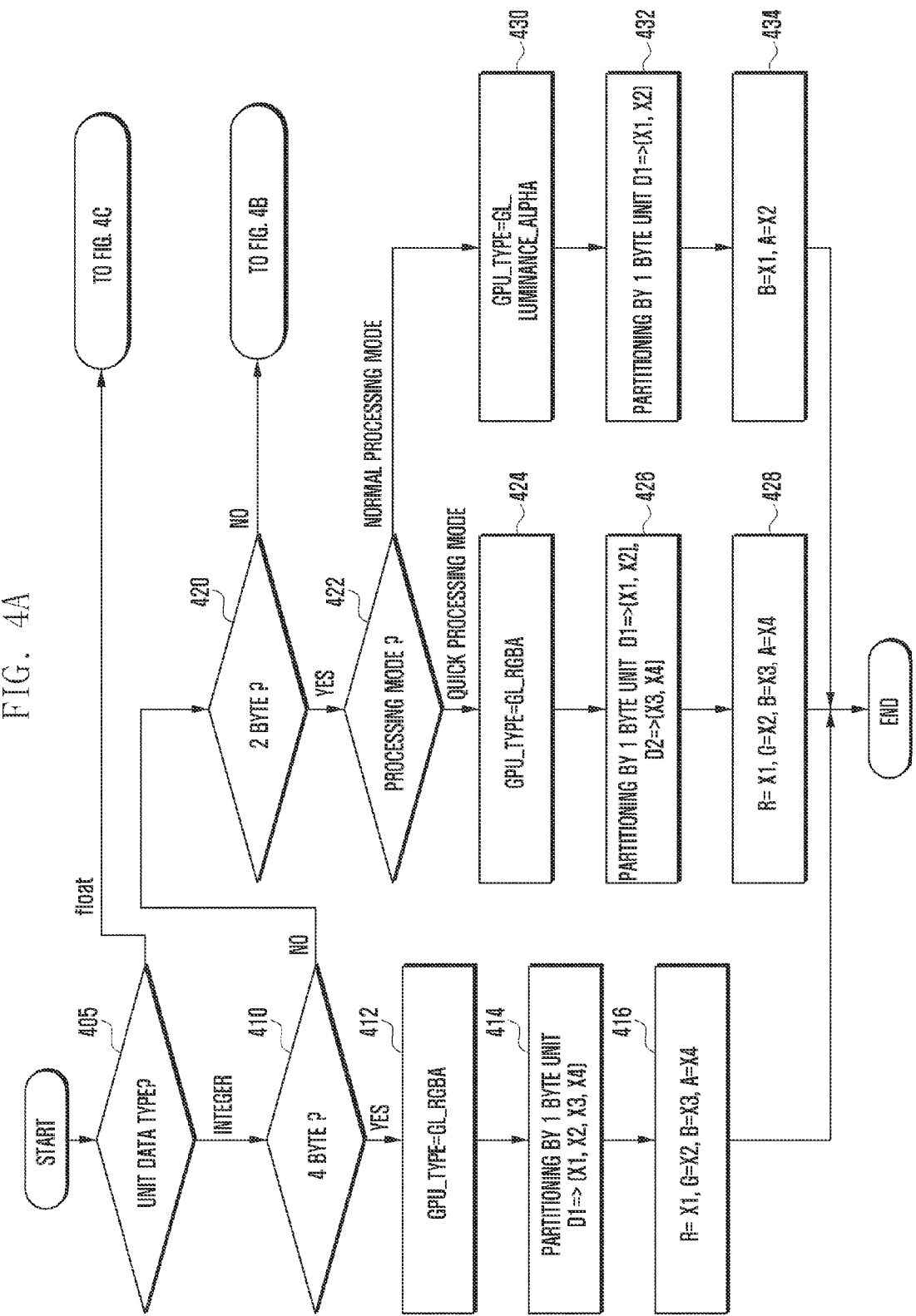
FIGS. 4A to 4C are flowcharts of a data partitioning procedure according to an embodiment of the present disclosure.
Figure 4B:
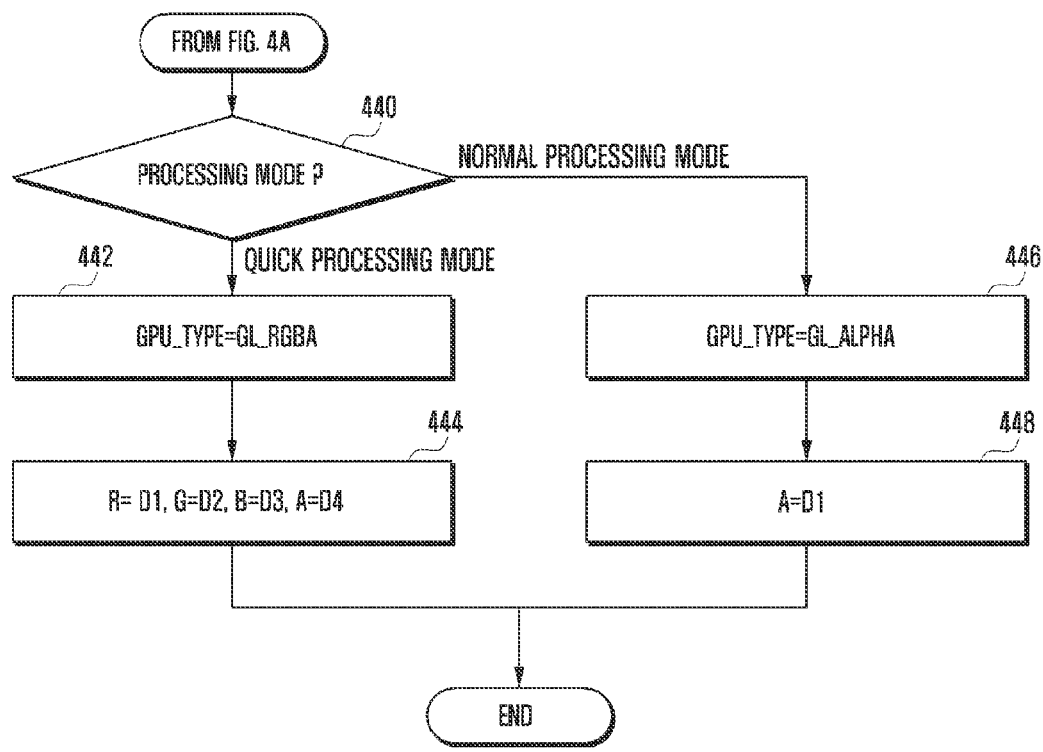
Figure 4C:
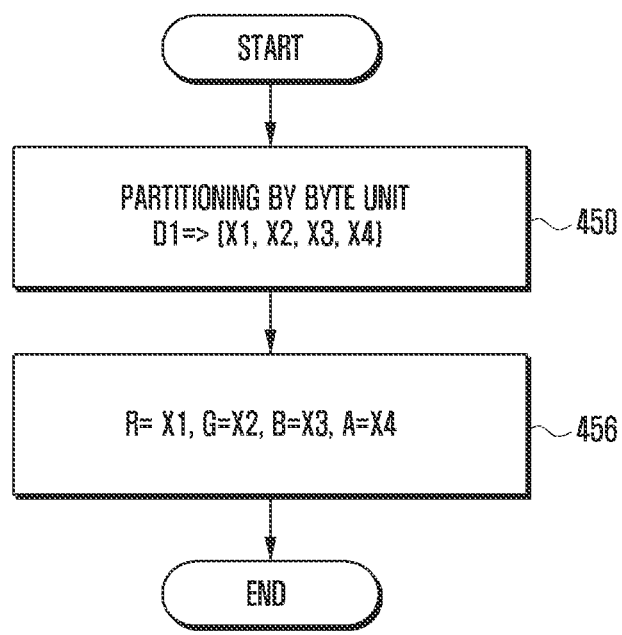

FIGS. 4A to 4C are flowcharts of a data partitioning procedure according to an embodiment of the present disclosure.

Referring to FIGS. 4A to 4C, hereinafter, in the data partitioning procedure and in a data restoring procedure described below, it is assumed, as an example, that the size of a channel element (R, G, B, A or the like) of texel is 1 byte and the size of unit data of operand data is 4, 2, or 1 byte. The size of the channel element (R, G, B, A or the like) of texel can vary between 16 bytes and 32 bytes. In addition, the size of unit data can vary between 8 bytes and 16 bytes. Here, it is described as an example that the size of the channel element (R, G, B, A or the like) of texel is 1 byte and the size of unit data of operand data is 4, 2, or 1 byte. In addition, it is arbitrarily set that which channel element corresponds to which part of data. For example, the channel element A may have a Most Significant Bit (MSB) or the channel element R may have an MSB. Here, the example case is described.

The GSIMD unit 110 determines the type of unit data at operation 405. The present embodiment describes the case in which a unit data is an integer and the case of a floating point real number (float). When the type of unit data is an integer, the procedure proceeds to operation 410. When the type of unit data is float, the procedure proceeds at operation 450 (FIG. 4C).

The GSIMD unit 110 determines whether the size of unit data is 4 bytes at operation 410. When the size of unit data is 4 bytes, the procedure proceeds to operation 412.

The GSIMD unit 110 selects a texture type of GL_RGBA type that has the same storage capacity as the size of unit data at operation 412. The texel of GL_RGBA type has four channel elements (R, G, B, A) that have the size of 1 byte respectively. The GSIMD unit 110 partitions input data D1 by 1 byte unit at operation 414.

Figure 5A:
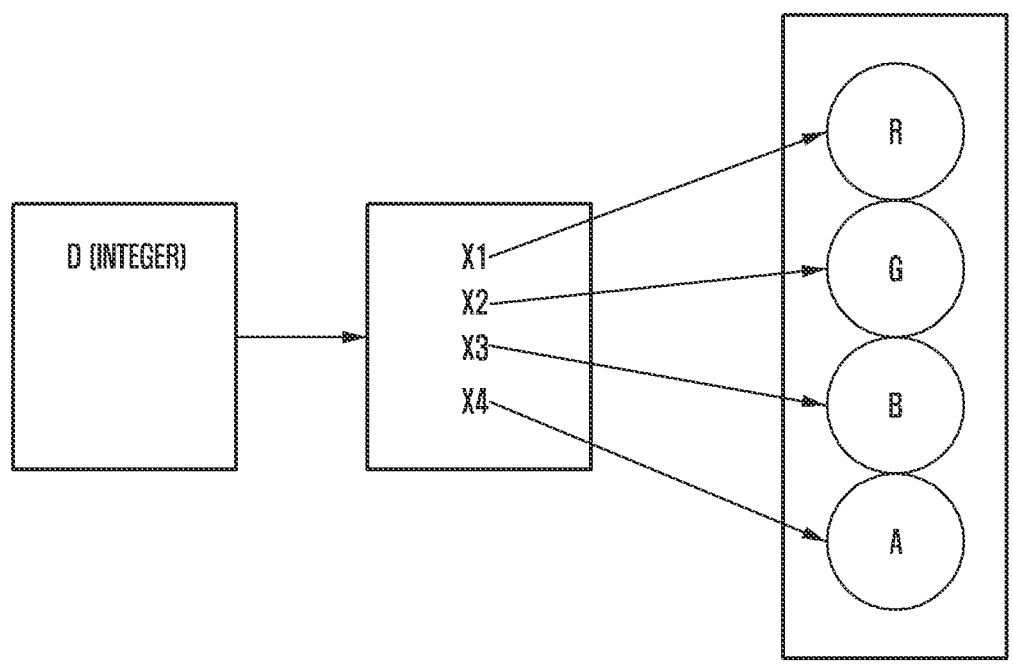
FIG. 5A is a diagram illustrating a partitioning of data of integer type of 4 byte according to an embodiment of the present disclosure.

FIG. 5A is a diagram illustrating a partitioning of data of integer type of 4 byte according to an embodiment of the present disclosure.

Referring to FIG. 5A, the operand data is simply partitioned into four parts by a byte unit to divide into X1, X2, X3, X4. It can be processed by utilizing an operation of a byte unit, an operation of dividing by $2^8$, $2^{16}$, $2^{24}$, or a mod operation (module) when dividing by $2^8$, $2^{16}$, $2^{24}$.

The GSIMD unit 110 matches the partitioned data X1, X2, X3, X4 to channel element R, G, B, A, respectively, to store at operation 416.

When it is determined at operation 410 that the size of unit data is not 4 bytes, the procedure proceeds to operation 420. The GSIMD unit 110 determines whether the size of unit data is 2 bytes at operation 420.

When the size of unit data is 2 bytes, the procedure proceeds to operation 422. When the size of unit data is not 2 bytes, the procedure proceeds to operation 440 of FIG. 4B.

The GSIMD unit 110 determines whether the set processing mode is a quick processing mode or a normal processing mode at operation 422. The processing mode may be set by a programmer or by other scheme. According to another embodiment of the present disclosure, the GSIMD unit 110 can be operated by the quick processing mode. According to another embodiment of the present disclosure, the GSIMD unit 110 can be operated by the normal processing mode. Here, it is described that one of the quick processing mode or the normal processing mode is selectively operated.

The quick processing mode is a mode that stores and processes a plurality of data having a small size, such as 2 bytes or 1 byte, at one time by using a texel of 4 bytes size. On the contrary, the normal processing mode is a mode that stores and processes data having a small size, such as 2 bytes or 1 byte, one by one by using a texel of 2 bytes size or 1 byte size.

When a quick processing mode is set at operation 422, the procedure proceeds to operation 424. The GSIMD unit 110 selects a texture type of GL_RGBA type having a storage capacity of 4 bytes at operation 424.

The GSIMD unit 110 partitions two unit operand data D1, D2 of 2 bytes size by a byte unit to obtain X1, X2, X3, X4 at operation 426.

The GSIMD unit 110 matches the partitioned data X1, X2, X3, X4 to channel element R, G, B, A, respectively, to store at operation 428.

When a normal processing mode is set at operation 422, the procedure proceeds to operation 430. The GSIMD unit 110 selects a texture type of GL_LUMINAANCE_ALPHA type having the same storage capacity as the size of operand data (2 bytes) at operation 430. The texel of GL_LUMINAANCE_ALPHA type has two channel elements (B, A) OF 1 byte size. The GSIMD unit 110 partitions the operand data D1 by a 1 byte unit to obtain the partitioned data X1, X2 at operation 432. The GSIMD unit 110 matches the partitioned data X1, X2 to channel element B, A, respectively, to store at operation 434.

Referring to FIG. 4B, when the size of unit data is not 2 bytes at operation 420, the procedure proceeds at operation 440. In this case, the size of unit data is 1 byte. The present embodiment is not concerned with other size data, but it can be similarly processed by partitioning with an appropriate scheme.

The GSIMD unit 110 determines the mode of a processing mode at operation 440.

When the processing mode is a quick processing mode at operation 440, the procedure proceeds to at operation 442.

The GSIMD unit 110 selects a texture type of GL_RGBA type having a storage capacity of 4 bytes at operation 442.

The GSIMD unit 110 matches four unit operand data D1, D2, D3, D4 to channel element R, G, B, A, respectively, to store at operation 444.

When the processing mode is a normal processing mode at operation 440, the procedure proceeds to operation 446.

The GSIMD unit 110 selects a texture type of GL_ALPHA type having the same storage capacity as the size of operand data (1 bytes) at operation 446. The texel of GL_ALPHA type has one channel element (A) of 1 byte size. The GSIMD unit 110 matches the operand data D1 to channel element A to store at operation 448.

When the type of unit data is float at operation 405, the procedure proceeds to operation 450 (FIG. 4C).

The GSIMD unit 110 performs a partition by a byte unit at operation 450. In this case, the partition can be processed simply by a byte partition operation in the same manner as the partition of an integer type.

Figure 5B:
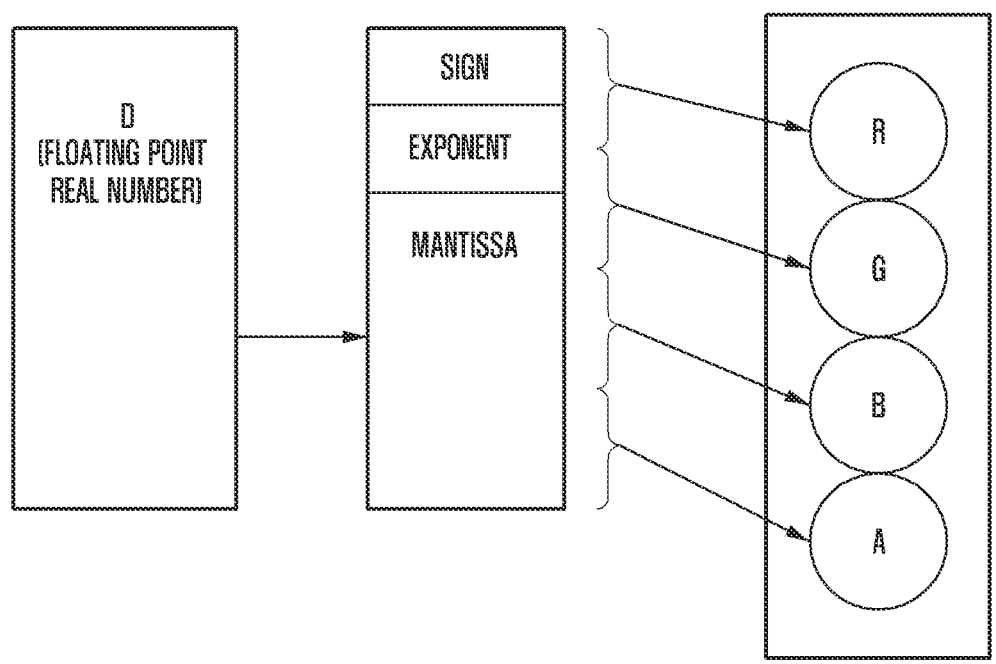
FIG. 5B illustrates a byte partitioning operation of floating point real number of 4 byte according to an embodiment of the present disclosure.

FIG. 5B illustrates a byte partition operation of floating point real number of 4 bytes.

Referring to FIG. 4C, the data X1, X2, X3 and X4 partitioned at operation 452 or operation 454 are assigned channel element R, G, B, A of texel of GL_RGBA type at operation 456.

Returning back to FIG. 2, the data handler 112 determines the texture type to be used at operation 235. The determination of texture type can vary according to the size of unit data and the processing mode as described with reference to FIG. 4A to FIG. 4C.

The data handler 112 transmits a texel generation instruction and a partitioned data to the GPU 190 at operation 240. The texel generation instruction may include a texture type, a number of texel to be generated, and other useful information. The GPU 190, which received the texel generation instruction and the partitioned data, generates a texel according to a texel instruction and stores the received partitioned data into the generated texel at operation 245.

As illustrated with reference to FIG. 5A and FIG. 5B, the data that is partitioned by 1 byte unit is stored into channel element R, G, B, A of texel.

The data handler 112 generates an operation instruction for controlling the GPU 190 at operation 250. The operation instruction may include an instruction for the operations of data restoring 262, an operation 265, and a result value storing 267, which will be described below.

The data handler 112 transmits the generated operation instruction to the GPU 190 at operation 255.

Thereafter, the frame buffer manager 114 transmits a draw instruction to the GPU 190 at operation 260. The GPU 190 that received the draw instruction starts to perform the operation instruction received at operation 255. The main operation of the GPU 190 may be performed in the shader 194.

The GPU 190 performs data restoring at operation 262. As illustrated in the description about operation 230 to operation 250, the operand data is partitioned by a channel element size unit (1 byte) of texel to transmit. Accordingly, for an actual operation, the partitioned data of channel element size unit (1 byte) of texel needs to be restored to an original operand data (i.e., 4 bytes or 2 bytes). To be sure, when the original operand data is 1 byte size, the restoring is not necessary and the data stored in the channel element of texel may be utilized just as it is.

Figure 6A:
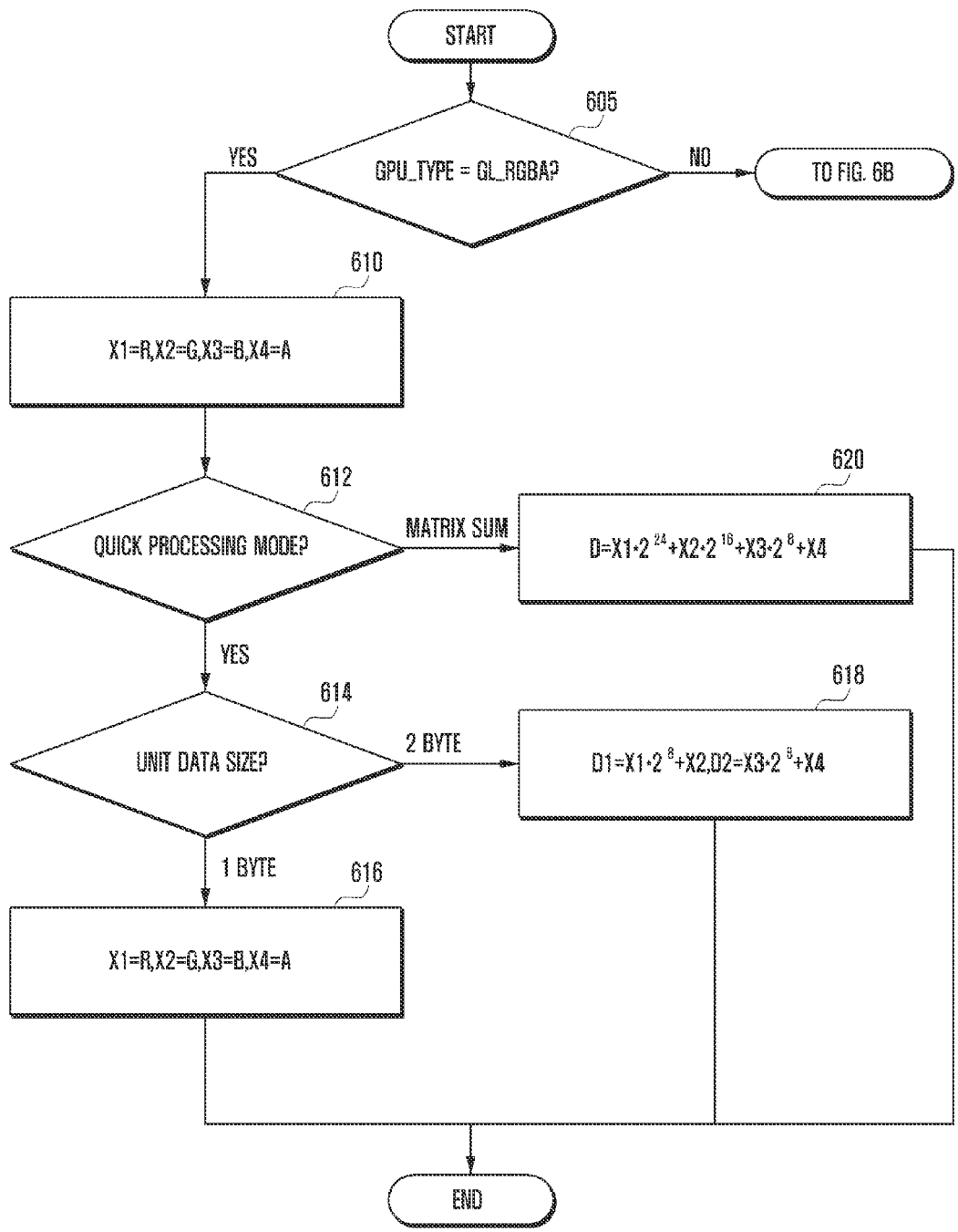
FIGS. 6A and 6B are flowcharts of an integer type operand data restoring procedure according to an embodiment of the present disclosure.
Figure 6B:
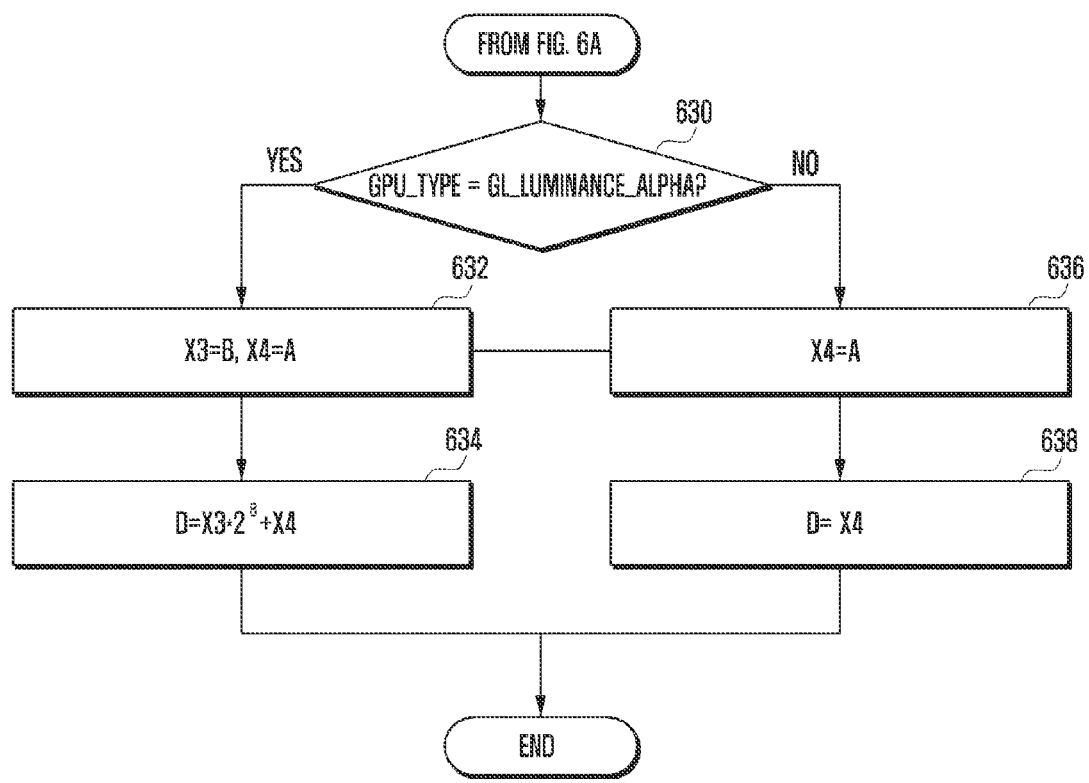

FIGS. 6A and 6B are flowcharts of an integer type operand data restoring procedure according to an embodiment of the present disclosure.

Referring to FIGS. 6A and 6B, the GPU 190 determines whether the texture type of the texel in which the partition data of operand data is stored is GL_RGBA (4 bytes size) at operation 605. When the texture type of the texel is GL_RGBA, the procedure proceeds to operation 610. The data of channel element R, G, B, A of texel is acquired into X1, X2, X3, X4 at operation 610. The GPU 190 determines whether the quick processing mode is set at operation 612. The setting of the quick processing mode can be changed according to the operation instruction received from the GSIMD unit 110. When the quick processing mode is not set, the GPU 190 restores the original operand data D (4 bytes) at operation 620. The equation for restoring is D=X1*224+X2*216+X3*28+X4. When a sign (+/−) bit exists, the equation can be modified by taking this into consideration. In an implementation, the restoring can be processed by simply concatenating a bit unit data.

When the quick processing mode is set, the procedure proceeds to operation 614. The GPU 190 determines the size of unit data at operation 614. The size of unit data can be changed according to the operation instruction received from the GSIMD unit 110. When the size of the unit data is 2 bytes, the GPU 190 restores the original operand data D1, D2 at operation 618. The equation of restoration is D1=X1*28+X2, D2=X3*28+X4. Thus, 2 byte operand data D1, D2 can be restored.

When the size of unit data is 1 byte, the GPU 190 restores the original operand data D1, D2, D3, and D4 at operation 616. The equation of restoration is D1=X1, D2=X2, D3=X3, D4=X4. Thus, 1 byte operand data D1, D2, D3, and D4 can be restored.

When the texture type of texel is not GL_RGBA at operation 605, the procedure proceeds to operation 630 (FIG. 6B). When the texture type of texel is not GL_RGBA, the size of unit data is 1 byte or 2 bytes. The GPU 190 determines whether the texture type of texel is GL_LUMINANCE_ALPHA (2 byte) at operation 630. When the texture type of texel is GL_LUMINANCE_ALPHA, the procedure proceeds to operation 632. The X3 and X4 are acquired from the channel element B, A of texel at operation 632. The GPU 190 restores D from X3 and X4 at operation 634. The equation of restoration is D=X3*28+X4.

When the texture type of texel is not GL_LUMINANCE_ALPHA, the procedure proceeds to operation 636. In this case, the texture type of texel is GL_ALPHA (1 byte). The GPU 190 extracts X4 from the channel element A of texel at operation 636, and may restore X4 into D at operation 638.

When the unit data of operand data is not an integer type, another partition scheme is utilized instead of the procedure of FIGS. 6A and 6B. The GPU 190 may acquire the partitioned data X1, X2, X3, X4 from the channel element R, G, B, A of texel.

The seventh bit of X1 becomes a sign bit, and, accordingly, the sign (S) of operand data is determined. The 0~sixth bit of X1 and the seventh bit of X2 may be combined to become an exponent part (E). In addition, the 0~sixth bit of X2 and the data of X3 and X4 may be combined to become a mantissa part (M). The operand data D may be restored by equation of restoring like D=S(1.M*2E).

Referring back to FIG. 2, the GPU 190 performs an operation at operation 265. For example, when obtaining a sum of two arrangements, a sum operation can be performed for each operand data. Alternatively, when obtaining a product, a corresponding complicated operation is performed. The GSIMD unit 110 generates an appropriate operation instruction depending on the operation to be performed and sends the operation instruction to the GPU 190 so that the GPU 190 may perform and process the instruction.

The GPU 190 stores the operation result in the frame buffer at operation 267. The location or the size of the frame buffer storing the result is determined through operation 210 to operation 220. At this time, the partition of data can be performed again so as to store in the frame buffer. The data partition of integer type can be performed similarly to a scheme described with reference to FIG. 4A to FIG. 4C. However, in a case of a floating-point number decimal, it can be performed by a following scheme. The 4 byte floating-point number real number may have a 1-byte sign, an 8-byte exponent part, and a 23-byte mantissa part. In this case, the sign bit (S) and $1 \sim 7^{th}$ bit of exponent part (E_7: E_1) are assigned to X1. The $0^{th}$ bit (E_0) of exponent part and the 16~22th bit (M_22: M_16) of mantissa part are assigned to X2. The 8~15th bit (M_15: M_8) of mantissa part are assigned to X3. The 0~7th bit (M_7: M_0) of mantissa part are assigned to X4. In addition, X1, X2, X3, X4 may be respectively stored in R, G, B, A channel element of buffer frame assigned to return the result value.

The frame buffer manager 114 fetches the result value of partitioned format from the frame buffer storing the result value at operation 270. The frame buffer manager 114 sends the result value of partitioned format to the data handler 112 at operation 275.

The data handler 112 restores the result value of partitioned format into a result data at operation 280. The scheme of the data restoring is similar to the scheme of FIG. 6A and FIG. 6B. However, in every case, the combination can be substituted by a simple concatenating of byte unit data.

The data handler 112 requests the GPU 190 to extinguish the texel for storing the partitioned operand data at operation 285. The frame buffer manager 114 requests the GPU 190 to extinguish the frame buffer for returning the result value at operation 290. Such a request procedure can be performed at any time after a corresponding resource is no longer needed.

The frame buffer manager 114 sends the restored result value to the CPU 180 at operation 295.

According to a modified embodiment of the present disclosure, the data stored in the frame buffer is swapped to a front buffer to display on the screen before sending to the CPU 190. For example, when an image filtering work is performed, the work is performed in a background buffer and, when the work is completed, it is swapped to a front buffer. Thereafter, the image that completed the filtering work may be displayed on a screen.

In addition, when one operation result is used again for another operation, it can be utilized by moving or copying data in the frame buffer of the GPU 190.

According to an embodiment of the present disclosure, in a system that includes not GPGPU but a normal GPU, the GPGPU can be easily used by using a simple API which is similar to the SIMD instruction without learning a new language. Since a smart phone has many application operations that require many data operations, the performance can be easily enhanced by utilizing the GSIMD.

Here, it can be understood that each block of flowcharts and the combination of flowchart diagrams are executable by computer program instructions. Since computer program instructions may be mounted in a processor of a universal computer, a special computer or other programmable data processing equipment, instructions performed through a processor of a computer or other programmable data processing equipment generates means for performing functions described in block(s) of the flowcharts. Since the computer program instructions may be stored in a computer or a computer readable memory capable of orienting a computer or other programmable data processing equipment to implement functions in a specific scheme, instructions stored in the computer or the computer readable memory may produce manufacturing articles involving an instruction means for executing functions described in block(s) of flowcharts. Because the computer program instructions may be mounted on a computer or other programmable data processing equipment, a series of operations are performed in the computer or other programmable data processing equipment to create a process executed by the computer such that instructions performing the computer or other programmable data processing equipment may provide operations for executing functions described in block(s) of flowcharts.

Further, each block may indicate a part of a module, a segment, or a code including at least one executable instruction for executing specific logical function(s). It should be noticed that several execution examples may generate functions described in blocks out of an order. For example, two continuously shown blocks may be simultaneously performed, and the blocks may be performed in a converse order according to corresponding functions.

As used in this embodiment, the term "~unit" refers to software or a hardware structural element, such as a Field Programmable Gate Array (FPGA) or an Application Specific Integrated Circuit (ASIC), and the "~unit" performs some roles. However, the "~unit" is not limited to software or hardware. The "~unit" can be configured to be stored in an addressable storage medium and to play at least one processor. Accordingly, for example, the "~unit" includes software structural elements, object-oriented software structural elements, class structural elements, task structural elements, processes, functions, attributes, procedures, subroutines, segments of a program code, drivers, a firmware, a microcode, a circuit, data, a database, data structures, tables, arrays, and variables. Functions provided in structural elements and "~units" may be engaged by the smaller number of structural elements and "~units", or may be divided by additional structural elements and "~units". Furthermore, structural elements and "~units" may be implemented to play a device or at least one CPU in a security multimedia card.

The present disclosure provides a method and an apparatus for data processing using a GPU that can improve the performance of an operation.

While the present disclosure has been shown and described with reference to various embodiments thereof, it will be understood by those skilled in the art that various changes in form and details may be made therein without departing from the spirit and scope of the present disclosure as defined by the appended claims and their equivalents.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

What is claimed is:

1. A method of processing data using a Graphic Processing Unit (GPU), the method comprising:
   obtaining, by a data handler, operand data and operator information to be applied to the operand data;
   partitioning, by the data handler, the operand data by a channel element size unit of a texel of the GPU;
   transmitting, by a frame buffer manager, an instruction which controls the GPU to return an operation result by performing an operation for the partitioned data and transmitting the partitioned data; and
   obtaining, by the frame buffer manager, an operation result value from the GPU,
   wherein the operation result value is a first operation result value when the GPU is operating in a first mode and a second operation result value different from the first operation result value when the GPU is operating in a second mode, and wherein the instruction controls the GPU to restore the partitioned data into an original operand data, perform an operation for the restored operand data, and store an operation result into a frame buffer of the GPU.

2. The method of claim 1, further comprising:
determining a size of a frame buffer of the GPU to which the operation result is returned according to a number of a row of the operand data, a number of a column, and a kind of an operation to be applied to the operand data,
wherein the operand data is a matrix.

3. The method of claim 1, further comprising:
determining a size of a frame buffer of the GPU to which the operation result is returned according to a number of a row of a first operand data and a number of a column of a second operand data among the operand data.

4. The method of claim 1, wherein the partitioning of the operand data comprises assigning two or more operand data to one texel, when a size of the operand data is two times a size of the channel element of the texel.

5. The method of claim 1, wherein the partitioning of the operand data comprises selecting a type of texture for storing the operand data according to a size of the operand data.

6. The method of claim 1, wherein the partitioning of the operand data comprises:
determining whether a quick processing mode is selected, when a size of the operand data is two times a size of the channel element of the texel;
assigning two or more operand data to one texel, when the quick processing mode is selected; and
selecting a type of texture for storing the operand data according to a size of the operand data, when the quick processing mode is not selected.

7. An apparatus for processing data using a Graphic Processing Unit (GPU), the apparatus comprising:
a data handler configured to:
obtain operand data and operator information to be applied to the operand data, and
partition the operand data by a channel element size unit of a texel of the GPU; and
a frame buffer manager configured to:
transmit an instruction which controls the GPU to return an operation result by performing an operation for the partitioned data and transmit the partitioned data, and obtain an operation result value from the GPU, wherein the operational result value is a first operational result value when the GPU is operating in a first mode and a second operation result value different from the first operation result value when the GPU is operating in a second mode, and wherein the instruction controls the GPU to restore the partitioned data into an original operand data, perform an operation for the restored operand data, and store an operation result into a frame buffer of the GPU.

8. The apparatus of claim 7, wherein the operand data is a matrix, and the frame buffer manager determines a size of a frame buffer of the GPU to which the operation result is returned according to a number of a row of the operand data, a number of a column, and a kind of an operation to be applied to the operand data.

9. The apparatus of claim 7, wherein the frame buffer manager determines a size of a frame buffer of the GPU to which the operation result is returned according to a number of a row of a first operand data and a number of a column of a second operand data among the operand data, when the operand data is a matrix and the kind of the operation is a matrix product.

10. The apparatus of claim 7, wherein the data handler assigns two or more operand data to one texel, when a size of the operand data is two times a size of the channel element of the texel.

11. The apparatus of claim 7, wherein the data handler selects a type of texture for storing the operand data according to a size of the operand data.

12. The apparatus of claim 7, wherein the data handler determines whether a quick processing mode is selected, when a size of the operand data is two times a size of the channel element of the texel, assigns two or more operand data to one texel, when the quick processing mode is selected, and selects a type of texture for storing the operand data according to a size of the operand data, when the quick processing mode is not selected.

13. A non-transitory processor readable medium for storing a computer program of instructions configured to be readable by at least one processor for instructing the at least one processor to execute a computer process for performing the method as recited in claim 1.

* * * * *